US008674946B2

(12) United States Patent
Doan et al.

(10) Patent No.: US 8,674,946 B2
(45) Date of Patent: Mar. 18, 2014

(54) METHOD AND APPARATUS FOR CONTROLLING TIMING OF STATUS CHANGE OF ELECTRONICS APPARATUS BASED ON USER'S FINGER LOCATION AND INPUT SPEED

(75) Inventors: Linh Doan, Torrance, CA (US); Michael Sabin, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1356 days.

(21) Appl. No.: 11/906,829

(22) Filed: Oct. 4, 2007

(65) Prior Publication Data
US 2009/0091540 A1 Apr. 9, 2009

(51) Int. Cl.
*G06F 3/041* (2006.01)

(52) U.S. Cl.
USPC ............ 345/173; 345/156; 715/862; 715/864

(58) Field of Classification Search
USPC .......... 345/156, 173–178; 715/854–855, 862, 715/864
See application file for complete search history.

(56) References Cited

U.S. PATENT DOCUMENTS

| 5,404,458 | A | * | 4/1995 | Zetts ............................... 710/73 |
| 5,579,037 | A | * | 11/1996 | Tahara et al. ................. 345/173 |
| 5,880,411 | A | * | 3/1999 | Gillespie et al. ........... 178/18.01 |
| 6,590,568 | B1 | * | 7/2003 | Astala et al. .................. 345/173 |
| 6,594,023 | B1 | * | 7/2003 | Omura et al. ................. 356/620 |
| 6,657,615 | B2 | * | 12/2003 | Harada .......................... 345/173 |
| 7,002,556 | B2 | * | 2/2006 | Tsukada et al. ............... 345/173 |
| 2002/0140671 | A1 | * | 10/2002 | Yamazaki ...................... 345/156 |
| 2005/0137825 | A1 | * | 6/2005 | Sako et al. ..................... 702/138 |
| 2006/0007174 | A1 | * | 1/2006 | Shen .............................. 345/173 |
| 2006/0022955 | A1 | * | 2/2006 | Kennedy ....................... 345/173 |
| 2006/0092142 | A1 | * | 5/2006 | Gillespie et al. .............. 345/173 |
| 2007/0097084 | A1 | * | 5/2007 | Niijima ......................... 345/173 |
| 2008/0284741 | A1 | * | 11/2008 | Hsu et al. ...................... 345/173 |

FOREIGN PATENT DOCUMENTS

| JP | 11-065769 | 3/1999 |
| JP | 2005-122450 | 5/2005 |

* cited by examiner

*Primary Examiner* — Jason Mandeville
(74) *Attorney, Agent, or Firm* — Muramatsu & Associates

(57) ABSTRACT

A method and apparatus adjusts a timing of state change of an electronics apparatus having an input device by measuring user's input speed for the input device and a distance of user's finger from the input device. The method includes the steps of measuring a current interval CI between recent two input operations in a series of input operations conducted through the input device, calculating an average interval AI of the series of input operations, calculating a reference interval RI determined from the equation: RI=K×AI, where K denotes a proportional coefficient, determining whether a current interval CI is equal to or less than the reference interval, and suspending an occurrence of the second system state change until a first system state has been responded in case when the current interval CI is equal to or less than the reference interval RI.

18 Claims, 9 Drawing Sheets

METHOD AND APPARATUS FOR CONTROLLING TIMING OF STATUS CHANGE OF ELECTRONICS APPARATUS BASED ON USER'S FINGER LOCATION AND INPUT SPEED

FIELD OF THE INVENTION

This invention relates to a method and apparatus for controlling an occurrence of event of an electronics apparatus, and more particularly, to a method and apparatus for controlling a timing of system status change of an electronic apparatus such as a navigation system in such a way that it adjusts or delays the system status change on the screen based on a location of user's finger, speed and interval of input operation by the user.

BACKGROUND OF THE INVENTION

Although the present invention can be used in any electronic apparatus, for convenience of explanation, it is mainly explained with respect to a navigation system. A navigation system performs travel guidance for enabling a user to quickly reach the selected destination. Typically, the navigation system displays a map image while superimposing thereon a mark representing the current location and notifies the user which intersection to reach the destination.

FIGS. 1A-1H illustrate an example of overall procedure and screen display involved in the navigation system for route guidance to a destination. FIG. 1A is an example of locator map screen of the navigation system when a destination is not specified. Typically, the navigation system displays a street on which the vehicle (current vehicle position VP) is running, on a map image and a name of the street.

FIGS. 1B-1F illustrate an example of a process for specifying a destination in the navigation system. When selecting a "Destination" menu on a menu screen of FIG. 1B, the navigation system displays an "Find Destination By" screen as shown in FIG. 1C for specifying an input method for selecting destination.

When the user's finger touches, for example, an "Address" on the screen (touch panel) in FIG. 1C, the "Address" method is selected and the navigation system displays a keyboard screen as illustrated in FIG. 1D. Suppose the user has input an address "2525 W. Carson" of a shopping mall, the navigation system displays a "Confirmation Destination" screen shown in FIG. 1E.

If the name and address on the screen shows the correct destination, the user enters and "OK to Proceed" key to proceed the next procedure. The navigation system calculates and determines a quickest way to the destination address as illustrated in FIG. 1F. Then the navigation system starts the route guidance as illustrated in FIG. 1G. When the user approaches the destination within a determined distance, the navigation system indicates that the destination is ahead as illustrated in FIG. 1H.

In a current navigation system, as a user inputs a street name characters from the order of the first character to the end, the navigation system checks the matching street name candidates based on the characters which have been input so far, by retrieving the candidate street names from the database. The navigation system automatically moves to a new screen including address candidates, irrespective of the input velocity by the user, when the matching entries are listed to a certain number even though the user is about to input some other characters. In this case, the user cannot stop current input operation even though an unexpected new screen appears on the display screen, which results in an unsuccessful input operation.

Namely, the current navigation system automatically completes input and grays-out buttons to disable some keys of the keyboards while keeping enabled keys in a normal color without considering how quickly the user wants to input a set of characters, nor does the navigation system know if the user is about to supply additional input. For example, suppose a user, who does not know the exact street name, has only input the first several characters of the street and stopped inputting the street name to remember what to input next. In this case, the automatic-complete (auto-complete) function starts working irrespective of the intention of the user.

An auto-complete function is a search function where when inputting first few characters in an input field of the screen, the CPU of a navigation system extends the street name search by looking up all names that match the base name regardless of the of the other components of the street name, such as a prefix, thereby increasing the possibility of finding matching entries from the database.

Further, since the current navigation system does not understand the user's finger movement, there arises a case where the navigation system displays a pop-up screen which is not related to the input operation, just before user's input operation. For example, suppose the user sees and understands the current system state illustrated in FIG. 1C and is about to select the "Address" method. While the user's finger is approaching the input device, there is a case that the state of the navigation system has been changed due to the sudden event such as a warning message that requires another time critical attention, etc.

FIGS. 2A-2E illustrate the input operation of the navigation system associated with the forgoing problems. The user sees and understands a current system state through the screen on the navigation system as illustrated in FIG. 2A. Then the user moves the finger to the touch panel to interact with the information displayed on the screen. In this case, the user selects an inputting method of the "Address" as illustrated in FIG. 2B.

Suppose that just before touching the screen, a pop-up screen, unrelated to this input operation is displayed on the screen due to the system event requested from other tasks or operating system of the navigation system as shown in FIG. 2C. However, the user cannot stop inputting action because the time interval between the start of user's action and the appearance of the pop-up screen is too short to suspend this action as shown in FIG. 2D. As a result, the user touches the key even though the state of the navigation system has been changed and this input operation becomes invalid in the new system state.

FIG. 2E illustrates the input operations described above in a time sequential manner. In FIG. 2E, points A, B, C and D correspond to the states of FIGS. 2A-2D, respectively. The system state has not been changed between point A and just prior to point C where the pop-up screen has appeared on the screen at point C. Since the system has been changed from the point C to D, the input operation conducted between this period is no longer valid.

For the problems described above, Japanese Patent Application Laid-Open Publication No. H11-65769 discloses a display control method for enlarging the neighborhood of user's finger on the screen when the distance from the finger to the touch panel is within a predetermined range. Japanese Patent Application Laid-Open Publication No. 2000-122450 discloses an image forming apparatus having a function for providing necessary information related to the switch for the user by detecting the position of the user's finger before the finger contacts the touch panel. Further, U.S. Pat. No. 7,002,556 discloses a touch responsive display and method for determining the position of user's finger by using a sensor to provide necessary information to the user before contacting the touch panel.

According to these techniques, the existence of the user's finger is detected to control the navigation system. However, the navigation system always determines solely based on distance such that the user is about to input information when the user's finger is within a certain distance from the input device. Thus, a precise user's action has not been detected such as when the user's finger is about to remove from the certain distance from the input device. Therefore, there is a need of more precise way for detecting and tracing the movement of user's finger to correctly interact the information and system state of the navigation system.

SUMMARY OF THE INVENTION

It is, therefore, an object of the present invention to provide a method and apparatus for controlling a system event in an electronics system in such a way that it adjusts or delays the status change on a display associated with the system event until a user completes an input operation.

It is another object of the present invention to provide a method and apparatus for controlling a system event in an electronics system in such a way that it adjusts or delays the status change on a display by monitoring a distance of finger, velocity or interval of the user's input operation.

One of the aspect of the present invention is a method for adjusting a timing of a second system state change on a screen of an electronics apparatus such as a navigation system including an input device for responding to information displayed on the screen. The method includes the steps of measuring a current interval (CI) between recent two input operations in a series of input operations conducted through the input device, calculating an average interval (AI) of the series of input operations, calculating a reference interval (RI) determined from the equation: $RI=K \times (AI)$, where K denotes a proportional coefficient, determining whether a current interval (CI) is equal to or less than the reference interval, and suspending an occurrence of the second system state change until a first system state has been responded in case when the current interval (CI) is equal to or less than the reference interval (RI).

In one example, the method further includes the steps of determining whether a user's finger is inside a threshold distance (TD), and repeating the above step of determining whether a user's finger is inside a threshold distance (TD); where the proportional coefficient is set within a range from 3.0 to 30.0.

Another aspect of the present invention is an apparatus for adjusting a second system state change on a screen of a navigation system including an input device for responding to information displayed on the screen. The apparatus comprises means for measuring a current interval (CI) of input operations conducted through the input device, means for calculating an average interval (AI) of the series of input operations, means for calculating a reference interval by a equation: $RI=K \times (AI)$, where K denotes a proportional coefficient, means for determining whether a current interval (CI) is equal to or less than the reference interval, and means for suspending an occurrence of the second system state change until a first system state has been responded in case when the current interval (CI) is equal to or less than the reference interval (RI).

According to the present invention, the method and apparatus measures the distance, velocity or interval of the user's input operation during consecutive touch screen input. When the user firstly presses the touch screen to provide input, the system will calculate the user's finger distance and movement from the touch panel. The system measures the current interval (CI) of input operations conducted by the user through the input device, calculates an average interval (AI) of the series of input operation conducted so far, sets a reference interval (RI) based on the average interval (AI) and compares the current interval (CI) with the reference interval (RI) to estimate the user's finger movement.

Further, by checking whether user's finger is within a predetermined threshold distance (TD) from the panel, and in case when the user's finger remains within the threshold distance (TD), HMI (Human Machine Interface) actions of the touch panel are suspended to anticipate consecutive letter input. When the user's finger is removed from the threshold distance (TD) and is not reentered the threshold distance, the HMI actions will be resumed. The system's anticipation of the user's input allows the HMI flexibility to accommodate different type of user behavior.

DETAILED DESERTION OF THE EMBODIMENT

The present invention will be described in detail with reference to the accompanying drawings. The method and apparatus for controlling occurrences of system event can be advantageously applied to a navigation system for controlling timings of occurrence of events on the navigation system when inputting characters. Although the present invention is mainly described for the case of navigation system for convenience, the present invention is not limited to such a particular application of the navigation system, but can be used for any other electronics devices that are associated with a process of key operations by the user.

Figure 1A:
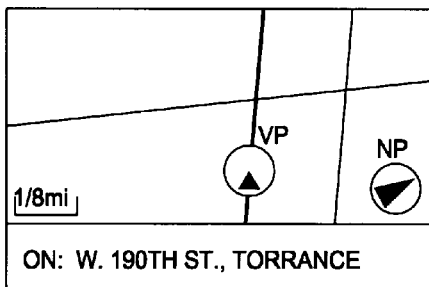
FIGS. 1A-1H are schematic diagrams illustrating an example of an overall operational process and screen display involved in the navigation system for selecting a destination.
Figure 1B:
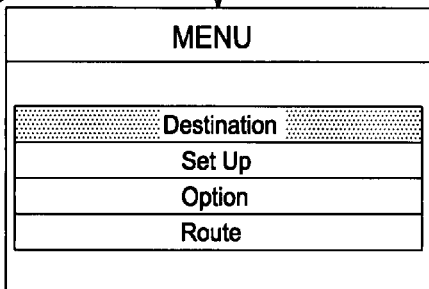
Figure 1C:
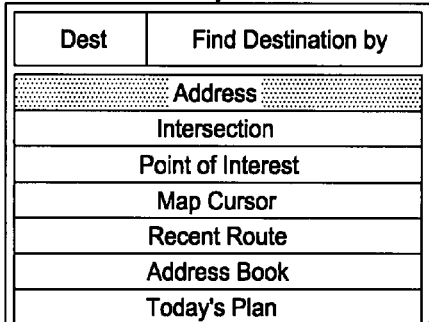
Figure 1D:
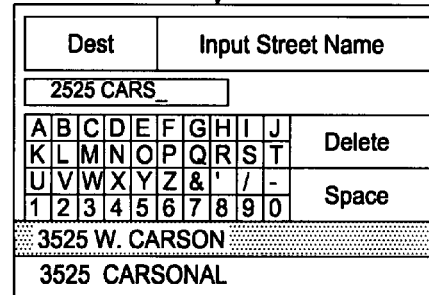
Figure 1E:
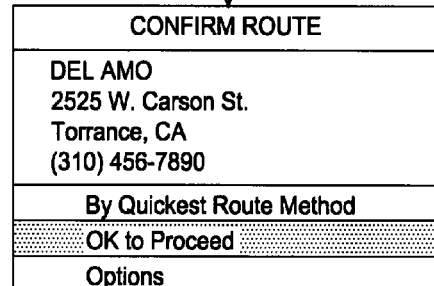
Figure 1F:
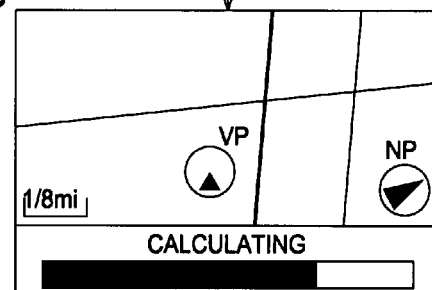
Figure 1G:
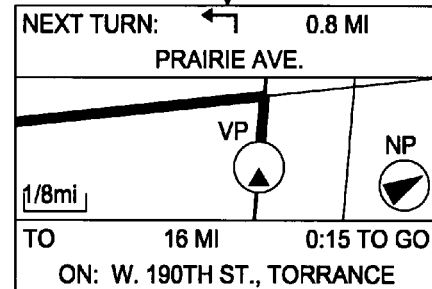
Figure 1H:
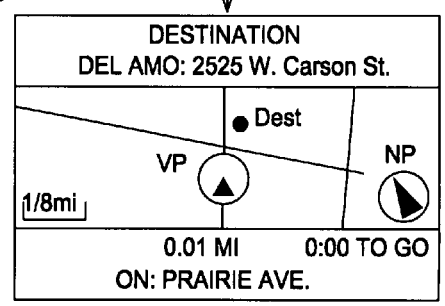
Figure 2A:
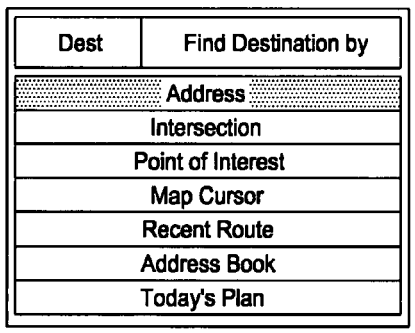
FIGS. 2A-2D are schematic diagrams illustrating a process for selecting a method of specifying a destination.
Figure 2A:
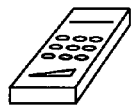
Figure 2B:
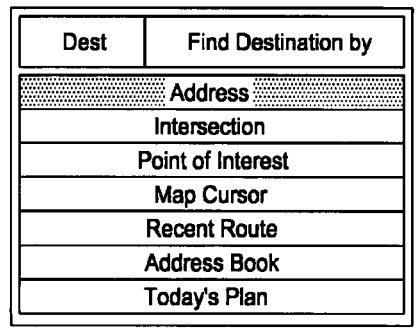
Figure 2B:
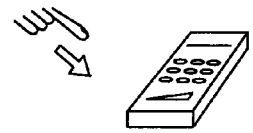
Figure 2C:
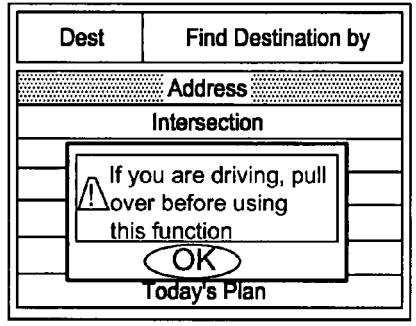
Figure 2C:
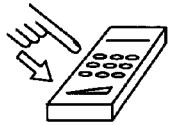
Figure 2D:
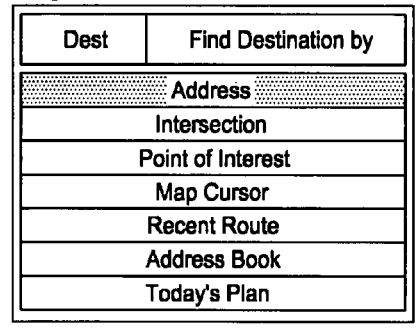
Figure 2D:
Figure 2E:
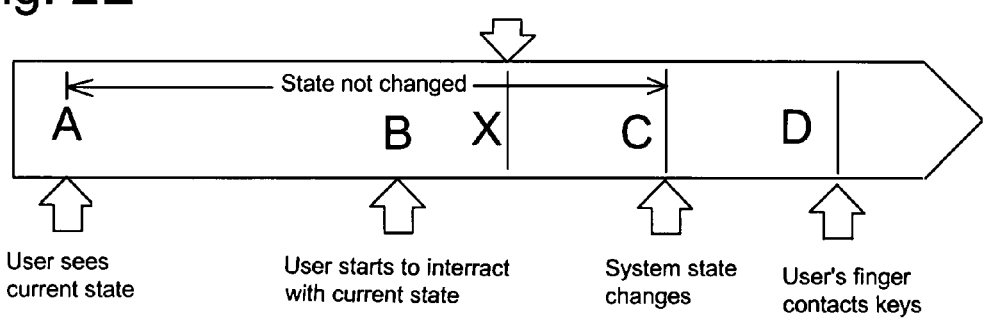
FIG. 2E illustrates respective operations illustrated in FIGS. 2A-2D in a time sequential manner.
Figure 3A:
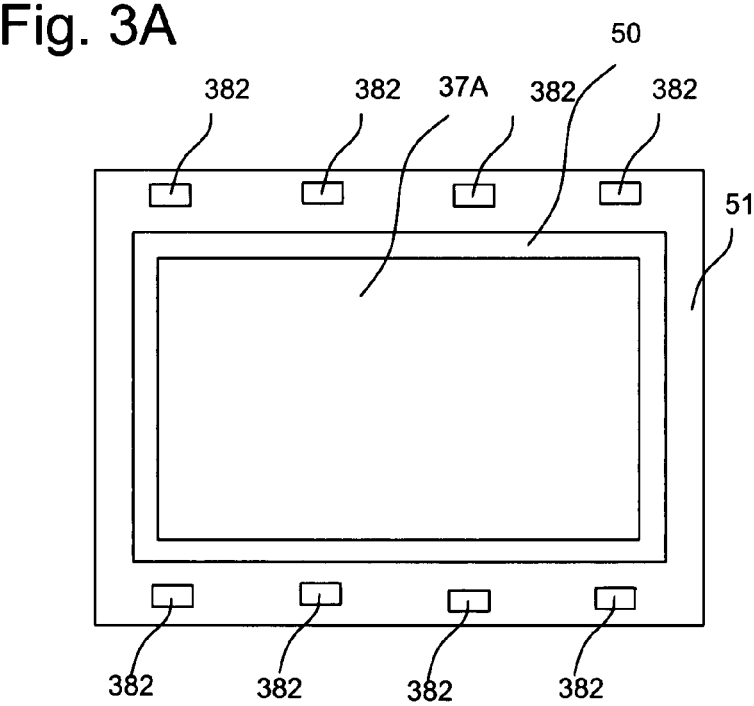
FIG. 3A illustrates a disposition of motion sensors in a display frame of the navigation system.

FIG. 3A illustrates a block diagram of a touch panel screen 37A (FIG. 10) of an embodiment of the present invention, which will be applied to an input device of an electronics apparatus such as a navigation system. In FIG. 3A, the touch panel 37A is installed onto a display screen 50, such as LCD (Liquid Crystal Display) panel. A plurality of motion sensors 382 for detecting a user's finger are installed inside a display frame 51 as shown in FIG. 3A. Although the plurality of motion sensors 382 are installed inside the display frame 51, the motion sensors 382 may also be installed into a remote controller 37B of the navigation system as well (refer to FIG. 10).

Figure 3B:
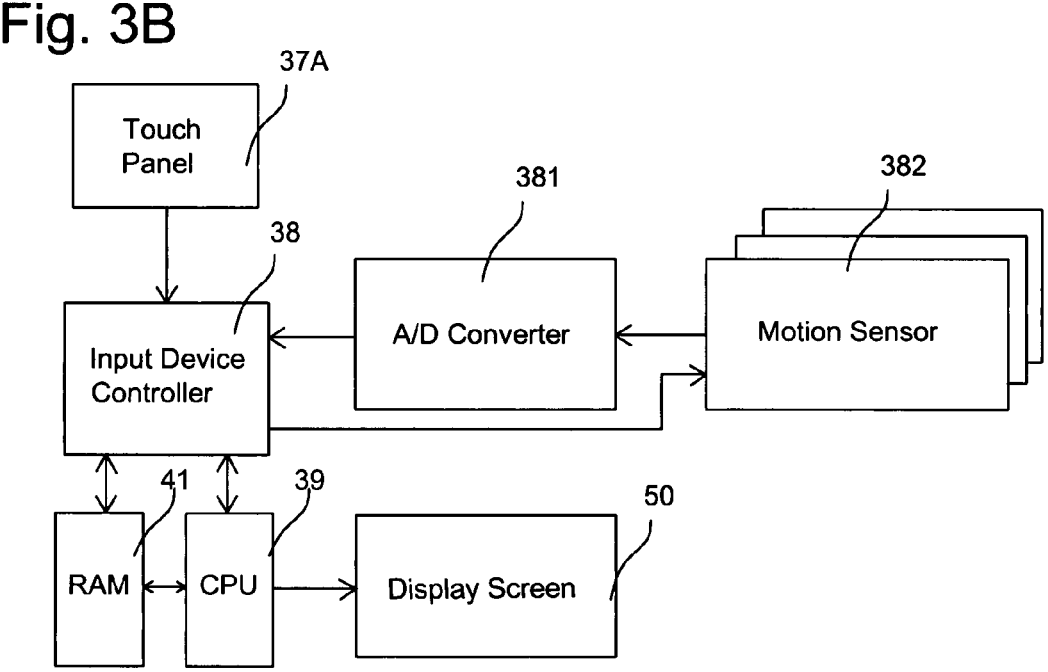
FIG. 3B is a block diagram showing an example of structure of the apparatus of the present invention.

FIG. 3B illustrates a block diagram of a status change timing control apparatus of the present invention for an electronics apparatus such as a navigation system, which includes an input device controller 38 for controlling the touch panel 37A, a plurality of motion sensors 382 that are connected to an A/D (Analog to Digital) converter 381, a CPU (Central Processing Unit) 39 which is arranged to communicate with the input device controller 38, a RAM 41 for temporarily storing data such as measured time intervals, etc., and the display screen 50.

Figure 10:
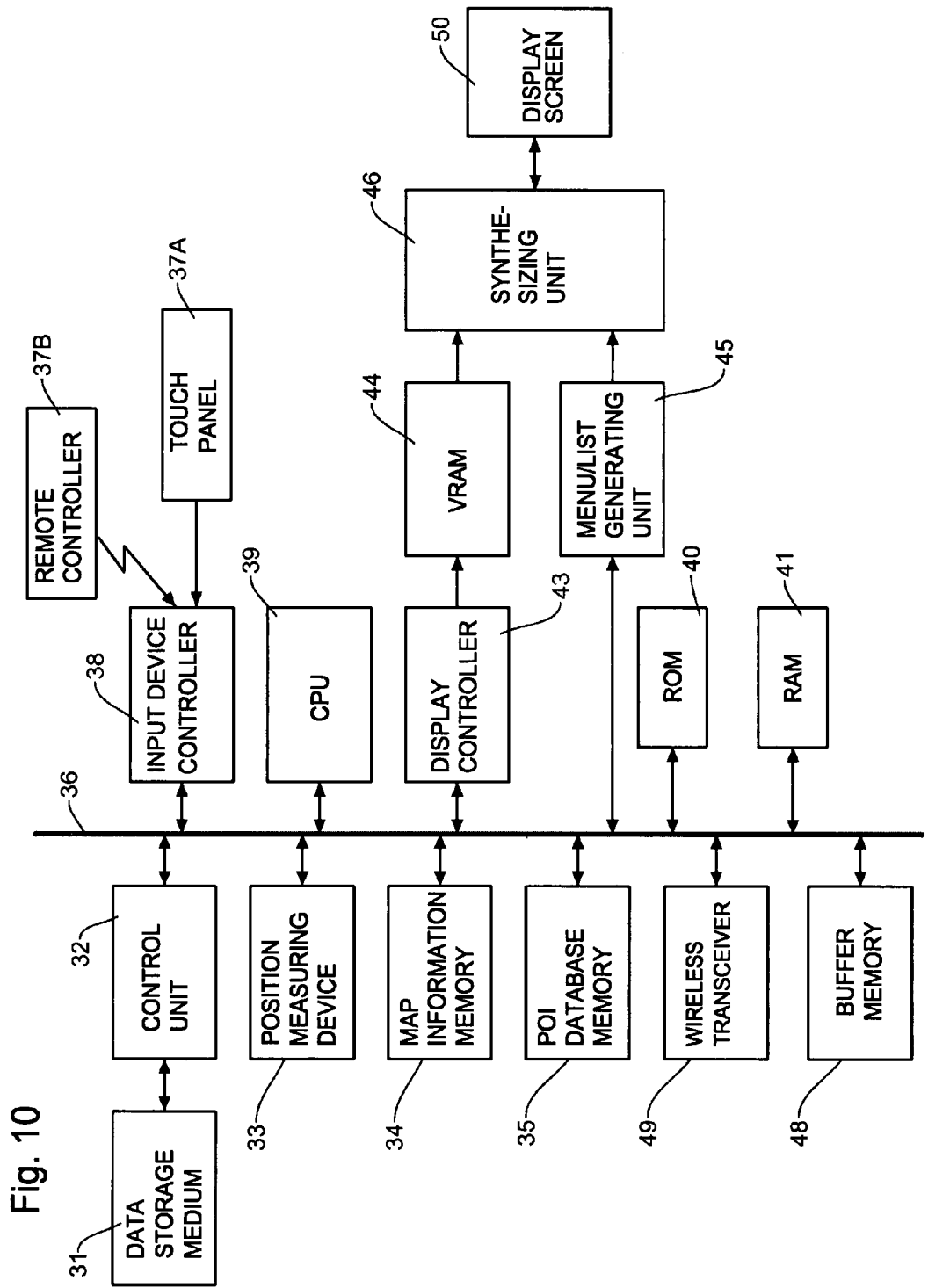
FIG. 10 is a block diagram showing an example of configuration of a vehicle navigation system implementing the method and apparatus for controlling occurrence of a system event in the vehicle navigation system.

In the navigation system, as described above, a user interacts with the information displayed on the display screen 50 by inputting response to the information on the display screen 50 by touching the touch panel 37A or an remote controller 37B (FIG. 10). In this embodiment, the plurality of motion sensors 382 which output analog voltages representing distances from a user's finger to the surface of the touch panel 37A, are provided inside the display frame 51. The A/D converter 381 converts the analog voltages to digital values and provides the digital values to the input device controller 38.

The input device controller 38 identifies which key is touched and allows the motion sensors 382 to emit and receive the reflected lights from the user's finger to track the movement of user's finger. Such movements of user's finger are monitored by processing the output signal of motion sensor 382 through the A/D converter 381.

Figure 4:
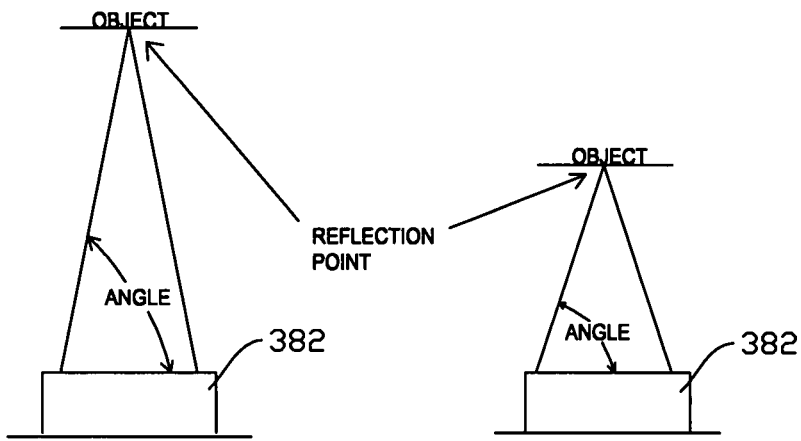
FIG. 4 is a schematic diagram showing an example of principle operation of a motion sensor used in an embodiment of the present invention.

With respect to the motion sensor 382 used in this embodiment, an infrared motion sensor may be employed. The infrared motion sensor includes an infrared LED (Light Emitted Diode) and a lens (not shown) side by side in a package and the CCD (Charge Coupled Device) (not shown), that receives the light from an object as illustrated in FIG. 4. When an object is in front of the sensor, the CCD will "see" the light reflected by the object. The distance from the motion sensor 382 to the object is detected based on the angle of the reflection. This motion sensor 382 continuously detects the angle of reflection and sends the detected signals to the input device controller 38 and CPU 39 where the processed data such as locations of finger, moving speeds, time intervals, etc., are stored in the RAM 41. A distance range that can be detected by the motion sensor 382 may be in a range, for example, from 4 cm (about 1.5") to 30 cm (about 12").

Figure 5:
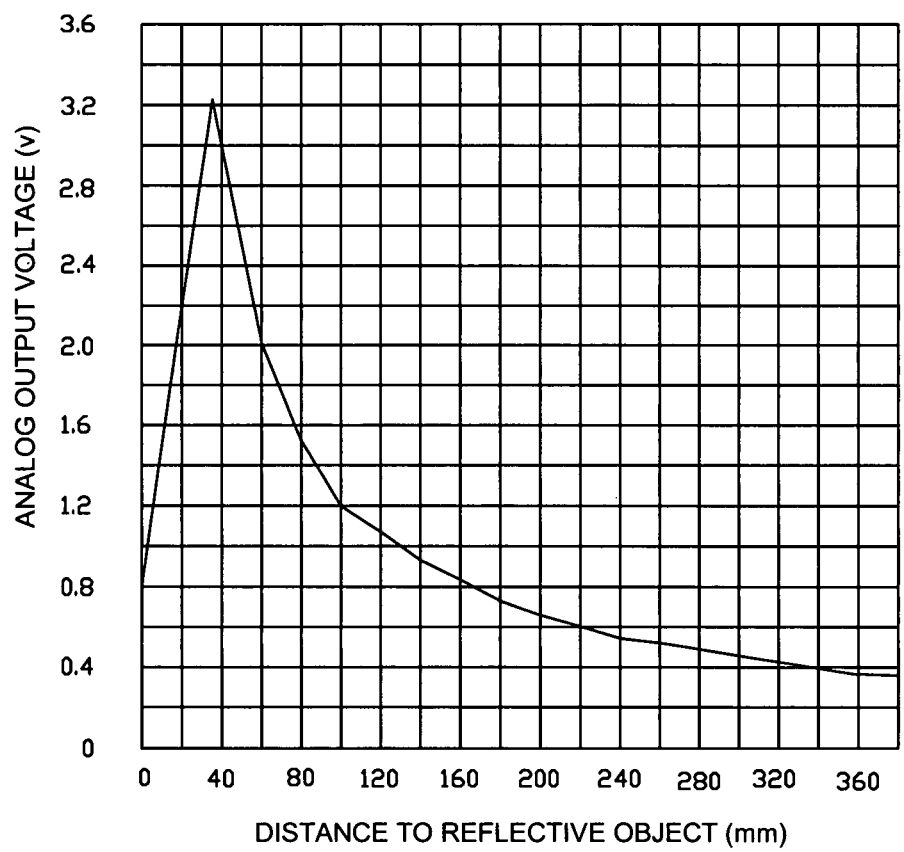
FIG. 5 is a graph illustrating output voltages versus distances from reflective object associated with the motion sensor shown in FIG. 4.

FIG. 5 illustrates output voltages versus distances between the motion sensors 382 to the object (finger) illustrated in FIG. 4. The output voltage of the motion sensor 382 is non-linear as illustrated in FIG. 5. The output signal of the motion sensor 382 is transmitted to the input device controller 38 and CPU 39 through the A/D converter 381 to measure the distance between the user's finger and the surface of the touch panel.

The LED (not shown) inside the motion sensor 382 is turned on by the input device controller 38 when the power of the navigation system is turned on to monitor the user's finger motion. The relationship between the output level of the motion sensor 382 and the distance to the user's finger position has been measured and formed into a look-up table stored in the ROM (Read Only Memory) 40 in FIG. 10 or other data storage in advance. Output signals from respective motion sensors 382 disposed around the touch panel 37A are sequentially scanned by the input device controller 38 to check whether user's finger enter a predetermined distance range from the surface of the touch panel 37A.

As illustrated in FIG. 5, the motion sensor 382 has a dead zone (less than 40 mm or 1.5 inch), i.e., a non-detectable range. Thus, preferably, the motion sensors 382 are placed lower than the touch panel surface at a depth equal to or larger than the dead zone so that the dead zone will not affect the operation of measuring the distance from the surface of the touch panel 37A.

The motion sensors 382 employed in this embodiment are widely used in robotics as motion sensors for detecting an object. Further, with respect to the motion sensor, other than the infrared sensor, a laser type motion sensor and a sound type motion sensor, which are able to provide information including velocity and acceleration of the object, may also be employed.

Figure 6A:
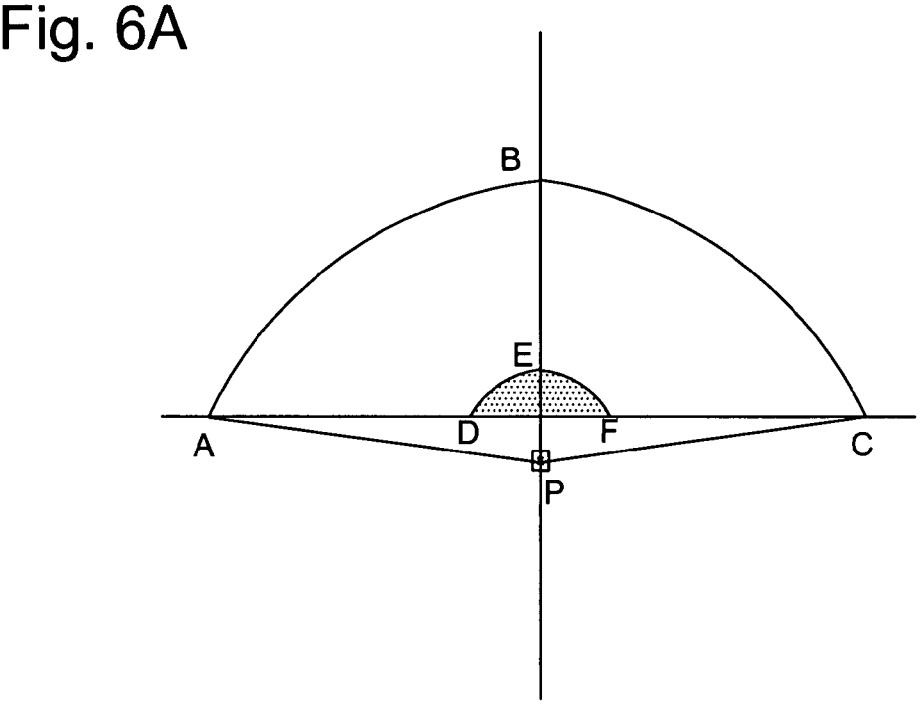
FIG. 6A illustrates an axial profile showing a sensing area and a dead area of the motion sensor illustrated in FIG. 4.
Figure 6B:
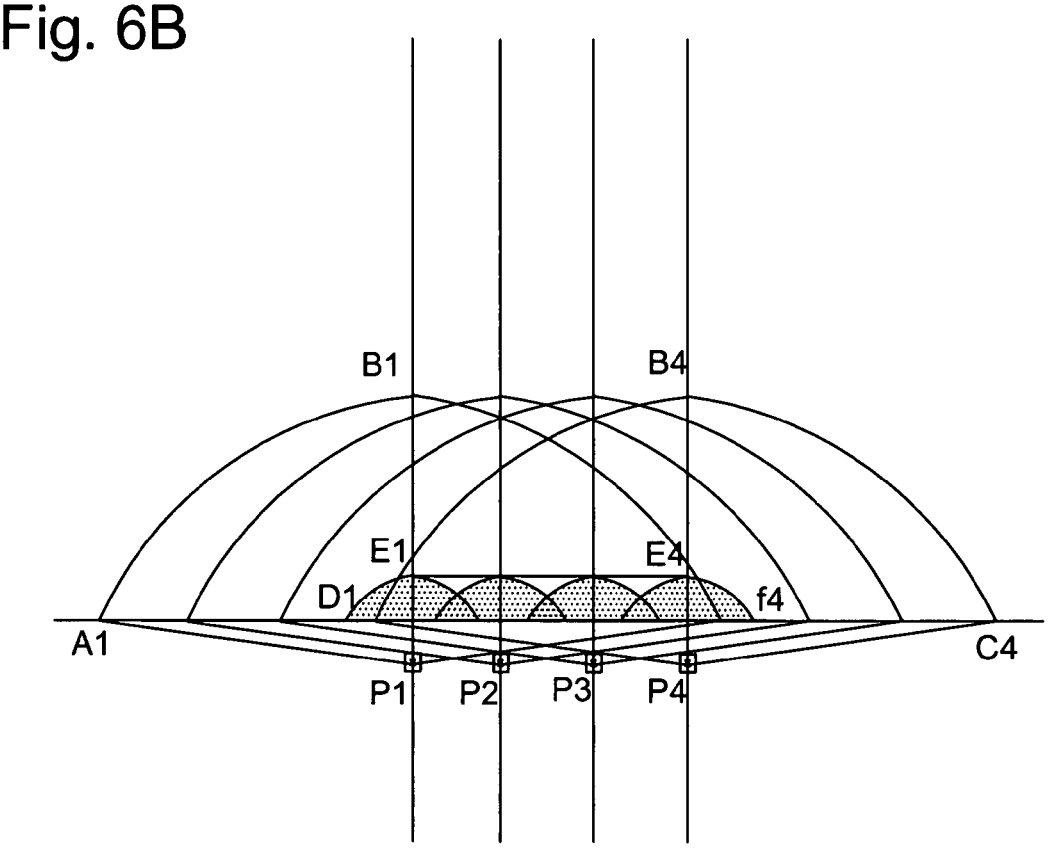
FIG. 6B illustrates an example of a plurality of motion sensors incorporated in touch panel, etc.

FIG. 6A illustrates an axial profile showing a sensing area and a dead zone of the motion sensor 382 illustrated in FIG. 5. The motion sensor 382 is placed on a point P. The shaded area indicated by DEF corresponds to the dead zone of the sensor, which cannot be used for measuring a distance to the object. Thus, an actual effective area is an area surrounded by ABC-DEF. FIG. 6B illustrates an example of sensing profile where a plurality of the motion sensors are used in the input device.

In the present invention, in the input device such as a touch panel screen, a remote controller, a keyboard, and a mouse, etc., a threshold distance (TD) is set to determine whether the object (ex., user's finger) is located inside the threshold distance (TD) or not. In this embodiment, the threshold distance (TD) is set at 4.5 cm (about 1.8 inch) from the surface of the touch panel. Namely, in the case where the user's finger tip reaches within the threshold distance (TD) from the surface of the touch panel, the CPU 39 determines that the user's finger is inside the threshold distance (TD) of the navigation system. It is preferable to set the threshold distance (TD) between 1-6 inches depending on the usage and purpose of the electronics apparatus (ex. the navigation system).

Figure 7:
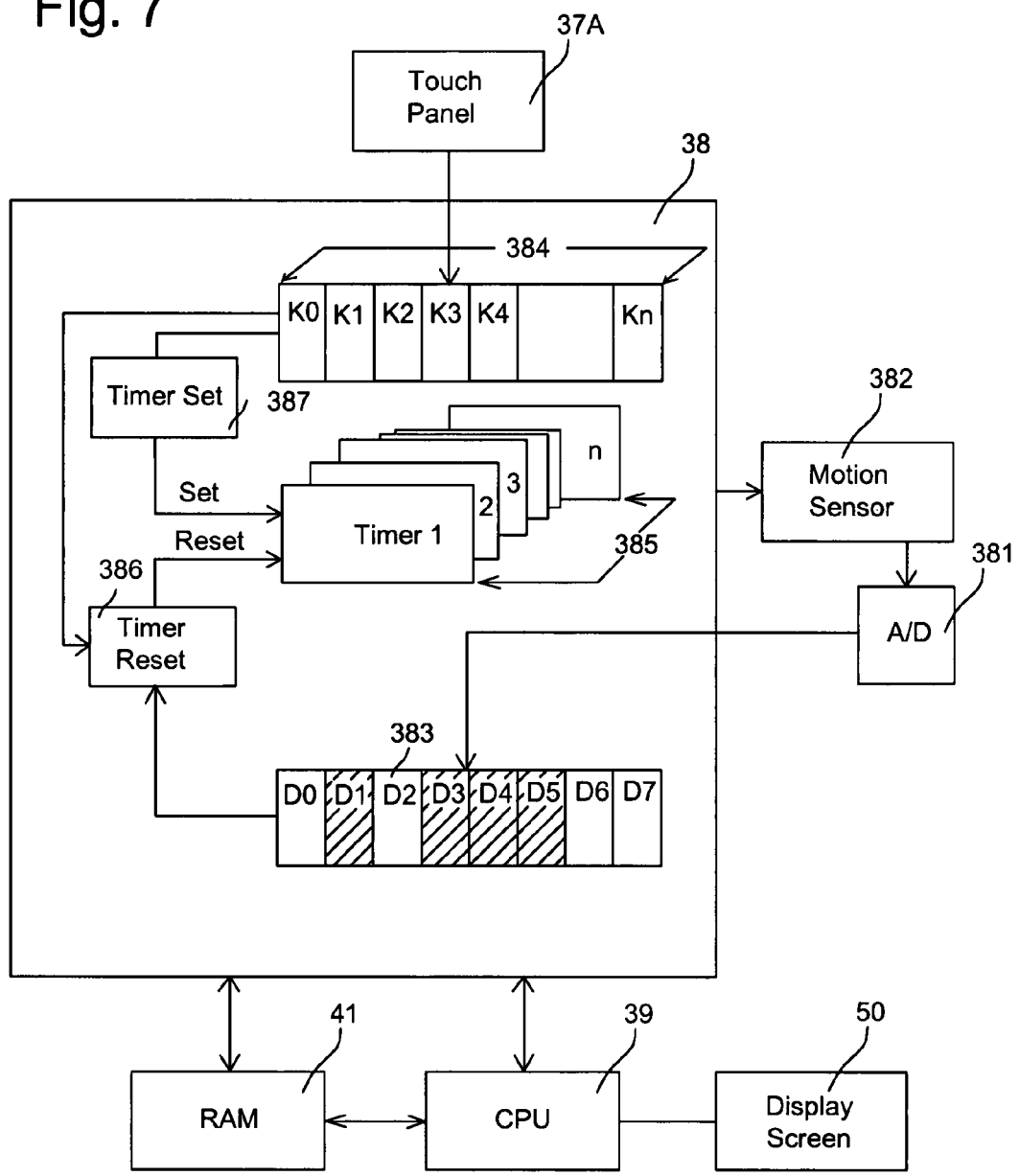
FIG. 7 is a block diagram showing an example of structure of the input device controller incorporated in the navigation system of the present invention

Next, the configuration of the input device controller 38 will be described with reference to FIG. 7 which is a block diagram showing an example of structure thereof. As described above, the input device controller 38 identifies which key is touched, performs the function specified by the key, allows the motion sensor 382 to emit infrared light and receive the reflected light from the user's finger, and tracks the movement of user's finger based on the detected signals from the motion sensors 382. Since the method and apparatus for determining which key is touched to perform the function specified by the key is well known, only the operation of the input device controller 38 directly related to the present invention will be described hereinafter.

The input device controller 38 includes a distance flag 383 for indicating whether the user's finger is within the threshold distance (TD), a key flag 384 for indicating whether the user's finger has touched the touch panel 37A, a timer 385 for measuring a time length between two successive input operations to determine the interval of the input operation through the touch panel 37A, a timer set circuit 387 for starting the timer 385 when the user's finger touches the key on the touch panel 37A, a timer reset circuit 386 to stop counting the timer 385 to transmit the timer data to the RAM 41 and restarting the timer 385 when user's finger touches the touch panel 37A at the next input operation or the user's finger removes from the threshold distance (TD).

The distance flag 383 is configured in such a way that the flag is set "1" when the user's finger enters inside the threshold distance (TD) and reset "0" when the user's finger goes outside from the threshold distance (TD). In this embodiment, total of eight flags corresponding to the total number of motion sensors 382 disposed in the display frame 51 are provided.

The key flag 384 is configured so that the flag is set "1" when the user's finger has touched the touch panel 37A and reset "0" after the CPU 39 has recognized which key has been touched. A plurality of key flags (K0-Kn) configure the key flag 384 to accept a series of input characters or numerals. In the preferred embodiment, 256 key flags are provided for the key flag 384. A plurality of timers 1-$n$ are provided corresponding to the plurality of key flags K0-Kn so that the time intervals between input operations in a series of input operations can be measured under the control of the timer set circuit 387 and the timer reset circuit 386 as described above.

When inputting a street name "MAIN ST", for example, the input device controller 38 operates as described below. First, the user's finger approaches the touch panel 37A to input the first character "M" and enters within the threshold distance (TD). The motion sensor 382 detects the movement of the user's finger and outputs a detection signal representing a distance from the surface of the touch panel 37A to the user's finger.

When the user's finger has entered inside the threshold distance (TD), distance flags corresponding to that distance are set. In the example of FIG. 7, the distance flags D1 and D3-D5 are set according to the relative position from the user's finger to respective motion sensors deployed in the display frame 51. When the first character "M" is input through the touch panel 37A, the key flag K0 is set. At the same time, a "timer 1" is set and starts counting a clock to measure a time interval.

When the second character "A" is input, the second key flag K1 is set and at the same time the timer 1 stops counting the clock and the counted value (time interval between the characters "M" and "A") of the "timer 1" is transmitted to the RAM 41. After that, the "timer 1" restarts a counting operation as long as any one of distance flag 383 remains in a set state. At the same time "timer 2" is set and starts counting an interval between the second character and the third character.

Thus, when completing the input of "MAIN", the RAM 41 obtains the interval data corresponding to the intervals between "M" and "A", between "A" and "I" and between "I" and "N" from the timers 1-3. The CPU 39 obtains an average input operation interval (AI) by adding consecutive intervals and diving the total intervals by the number of characters that have been input. In this case, the average input operation interval (AI) (hereafter, "average input interval" or "average interval") can be obtained by adding intervals between "M" and "A", between "A" and "I" and between "I" and "N" and dividing the total time by the total number of characters, which is four.

Because the input device and the associated components of the present invention are configured as described above, it is possible to estimate the action by the user. Namely, the CPU 39 is able to estimate how quickly the user wants to input a series of characters. The CPU 39 is further able to estimate whether the user is about to input some more charters by judging if the user's finger remains inside the threshold distance (TD).

In the conventional navigation system, as the user inputs one or more characters of a street name, the CPU 39 checks the matching street name candidate based on the characters which have been input so far by retrieving the candidate street names from the database. The navigation system automatically moves to a new screen showing a list of candidate street names irrespective of the input interval of the user. The navigation shows a new screen without regard to whether the user is about to input some other characters.

In the present invention, however, by using the average interval (AI) described above, the CPU 39 can adjust the occurrence of a new screen (system event change) according to the average interval (AI) of each user of the navigation system. For example, a user having a input velocity of 60 words per minute, which corresponds to about 300 characters per minute (average interval (AI) is about 200 msec per character), stops the input operation, and no input operation is executed for 2 seconds (in this embodiment, a reference interval (RI)=K×(AI) is calculated by setting proportional constant 10), the CPU 39 may determine that the key input has been completed unless the user's finger remains inside the threshold distance (TD).

In case when a user having an input velocity of 20 words per minute, which corresponds to about 100 characters per minute, ((AI): about 600 msec per character) stops the input operation, and no input operation is executed for 6 seconds ((RI)=10×600 msec), the CPU 39 may determine that the key input has been completed unless the user's finger remains within the threshold distance (TD).

As described above, by using the embodiment of the present invention, the reference interval (RI) to be compared with the current interval (CI) to determine whether the user is about to input character can be varied in response to the input operation habit of respective users.

When, having completed inputting a character set, and user's finger is removed from the threshold distance (TD) and all distance flags 383 are rest to "0", the CPU 39 resets the timer 385 for the next input operation. In other words, the navigation system can also be arranged so that the current input screen can remain unchanged as long as the user intentionally keeps his or her finger inside the threshold distance (TD).

According to the embodiment described above, a user who likes to input characters very quickly will not be hindered by the search functionality of the navigation system, i.e., the navigation system allows the user to completely enter their search string. Users who input characters quickly will keep their finger in the threshold distance (TD) for the next character input. The navigation system will recognize this behavior and temporarily disable the HMI auto-complete functionality.

For those users that who do not know the exact name (ex. street name) to search, they will enter one character and remove their fingers from the threshold distance (TD) or keep their fingers within the threshold distance (TD) while they are deciding what to input next. In this case, the CPU 39 will monitor the distance flags and other related data, such as an average input operation interval (AI) stored in the RAM 41 and adjust the HMI auto-complete functionality according to the user's finger position in terms of the touch panel and the average input operation interval (AI).

Figure 8:
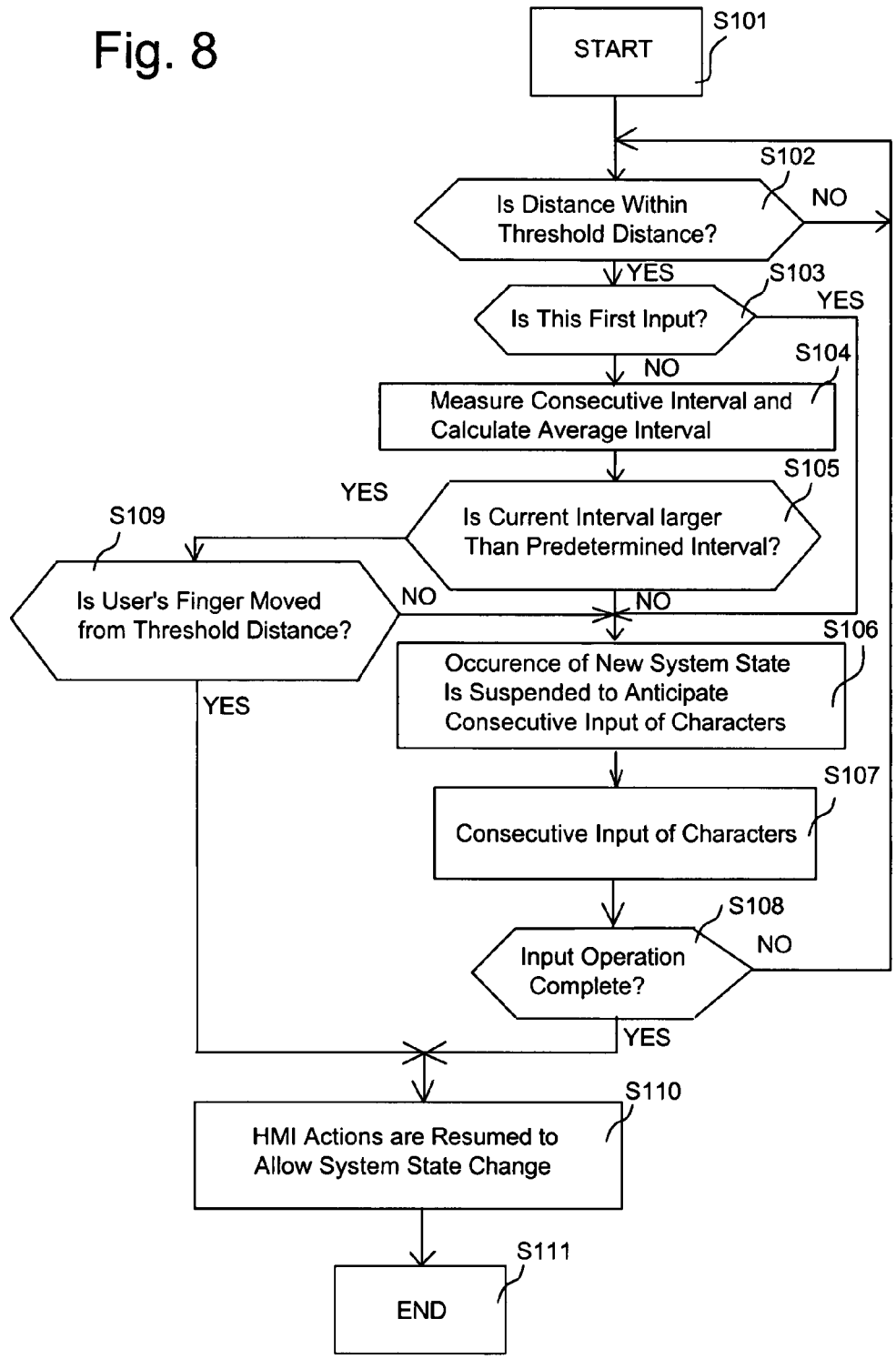
FIG. 8 is a flow chart showing an example of operational steps for controlling a system event associated with an interval of input key operation and a distance from an input device to the finger of a user of the navigation system pertaining to the invention.

FIG. 8 illustrates a flow chart showing overall operational steps of the present invention for sensing a distance and movement of a user's finger to allow the navigation system to control the system state changes. Such a system state change includes a new screen showing a list of candidate street names, a pop-up screen showing a warning message, etc., associated with navigation system. It should be noted that the application of the present invention is not limited to the navigation system, thus, particular examples related to the navigation system are made only for the purpose of convenience of explanation.

When the power of the navigation system is turned on, the process of the present invention starts at the step S101. Then, the CPU 39 starts determining whether the user's finger (ex. finger tips) comes inside the threshold distance (TD) set in advance by monitoring the distance flag 383 in the input device controller 38 in the step S102. The CPU 39 periodically runs the routine for sensing the distance and movement of a user's finger together with other routines of the navigation system.

When the user's finger remains outside the threshold distance (TD), i.e., the answer of the step S102 is negative, the process returns to the start step S101 to monitor the movement of user's finger. In the case where the user's finger has entered inside the threshold distance (TD), the answer of the step S102 is affirmative, the CPU 39 determines, in the step 103, as to whether this is the first input in a series of characters to be input from the consecutive distance flag history stored in the RAM 40.

When it is determined that this is the first input operation in the step S103, since the current interval cannot be obtained only with a very first input character without following input character, the CPU 39 moves the process to the step S106 to suspend an occurrence of a possible new system state (possible new HMI activity on the display screen 50) to anticipate an input of consecutive alphabetic or numeric character. At the same time, the timer 1 (FIG. 7) is started to measure a current interval (CI) when the first alphabetic or numeric character has been input and the timer set circuit 387 activates the "timer 1" as previously described.

While continuing the input operations, the CPU 39 calculates the current interval (CI) and the average interval (AI) and stores them into the RAM 41 as described previously. As the input operation continues, the previous average interval (AI) is overridden by the latest average interval (AI), which has been re-calculated by adding a newly calculated current interval in the step S107.

In the step S108, the CPU 39 determines whether the user touches the "OK" key or its equivalent key, by which the user intentionally completes the input operation. When the CPU 39 determines that the user intentionally completes the input operation in the step S108, the CPU 39 resumes the HMI actions to allow the navigation system to change the system state if necessary. Otherwise, the process moves to the step S102 and repeats the foregoing process.

In the case where the current input operation is not the first character in the step S103, i.e., it is for the second or other following characters, in the step 104, the CPU 39 measures the current interval (CI) by stopping the timer 385, which has been set by the previous input operation. The CPU 39 measures the current interval (CI) and starts the next timer as previously described. Then, the measured data (current interval (CI)) is transmitted to the RAM 41 and stored therein. By accumulating the data of current interval (CI), an average interval (AI) can be determined as noted above, which is also stored in the RAM 41.

Then, the CPU 39 calculates a reference interval (RI) by multiplying a proportional coefficient "K" to the average interval (AI) obtained at step S107: $RI=K \times AI$. In this embodiment, the coefficient (constant) is set to "10". It is preferable that the proportional coefficient K is set within a range from 3.0 to 30.0. In the case when designing an apparatus for people who like to slowly input characters, the proportional coefficient K may be set large such as "30" and for people who like to input characters at high speed, the proportional coefficient K may be set to small such as "3".

In the step S105, the obtained current interval (CI), which denotes a time period between the previous input operation and the current input operation, is compared with the reference interval (RI). In this embodiment, the CPU 39 determines whether the user is about to input another character by comparing the current input interval (CI) with the reference interval (RI). When the CPU 39 determines that the user is about to input the next character, namely, the current interval (CI) is less than the reference interval (RI), the process moves to the step S106.

In the case where the CPU 39 determines that no input character is expected, namely, the current input interval (CI) is equal to or larger than the reference interval (RI) in the step S105, the CPU 39 further determines if user's finger is removed from the threshold distance (TD) in the step S109. If it is determined that the user's finger tip is still inside the threshold distance (TD) in the step S109, the CPU 39 judges that the user still has an intention to continue input operation and moves the process to the step S106 to wait the input of next character.

When it is determined that the user's input finger is retracted from the threshold distance (TD) in the step S109, the CPU 39 judges that the user has no intention to input a further character. Thus, the CPU 39 moves the process to the step S110 to resume the HMI actions (ex. auto-complete function) to allow the navigation system to change the system state. The process ends at the step S111.

According to the process shown in FIG. 8, a user that likes to input characters very quickly will not be hindered his/her input operation for searching a street name for a navigation system. Namely, based on the detected data from input device controller 38, the present invention allows the user to completely enter the entire string of characters. The present invention recognizes this behavior and disables the HMI auto-completes functionality.

For those users that do not know the exact name of street name, etc. to search, they will enter one character and remove their finger from the specified touch panel distance or keep their fingers within the threshold distance (TD) while they are considering what to input next. In this case, the input device controller 38 will monitor these parameters and adjust the HMI auto-complete functionality accordingly to the user's finger location/movement.

FIGS. 9A-9D are schematic diagrams illustrating a selection process for selecting a method for specifying a destination in the navigation system to which this invention has been applied. Namely, the situations of FIGS. 9A-9D are similar to that of FIGS. 2A-2D except that the method of the present invention is incorporated in FIGS. 9A-9D. FIG. 9E illustrates respective operations described in FIGS. 9A-9D in a time sequential manner.

Figure 9A:
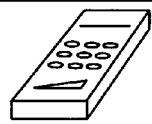
FIGS. 9A-9D are schematic diagrams illustrating a selection process for selecting a method for specifying a destination in the present invention.
Figure 9B:
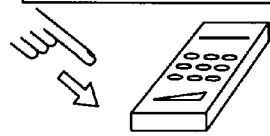

The user sees and understands a current system state through the screen on the navigation system as illustrated in FIG. 9A which shows a list of input methods for specifying a destination in the navigation system. Then, the user moves the finger toward the input device to interact with the information displayed on the screen. In this case, the user selects an input method "Address" and moves the finger to the input device such as a touch panel or a remote controller as shown in FIG. 9B.

Suppose that just before touching the input device, a system trigger occurs that would change the system state, which is not related to this input operation, due to an event requested from the other tasks or the operating system of the navigation system. In this case, the CPU 39 detects that the user's finger is already within the threshold distance (TD). Then, the CPU 39 suspends the status change of the screen even though the system trigger has been issued until the consecutive user's input operation is completed or the user's finger retrieved from the threshold distance (TD).

Figure 9C:
Figure 9D:
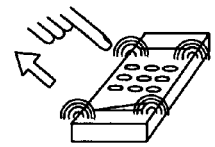
Figure 9E:
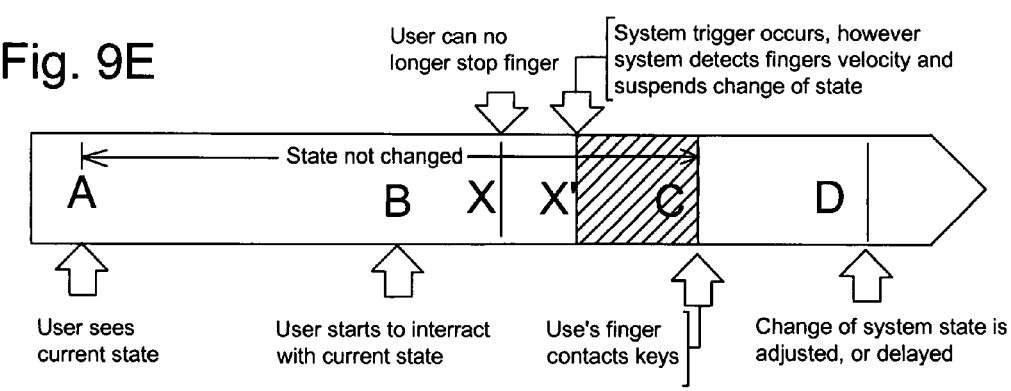
FIG. 9E illustrates respective operations described in FIGS. 9A-9D in a time sequential manner.

Thus, as shown in FIG. 9C, user's finger can execute the input operation for specifying an address (street name) while the CPU 39 adjusts or delays the state change of the navigation system. The CPU 39 confirms the completion of the user's input operation and resumes the HMI activities. As a result, the system change on the screen is permitted and a pop-up screen appears on the screen as shown in FIG. 9D after the adjusted timing or delays.

FIG. 9E illustrates the input operations illustrated in FIGS. 9A-9D in a time sequential manner. In FIG. 9E, points A, B, C and D correspond to the respective events of FIGS. 9A-9D. At a point "A", the user sees and understands the system state, which invites the user to select a method for inputting a destination on the touch panel. At a point B, the user selects an inputting method of the "Address" and moves his or her finger to the touch panel or the remote controller. A point "X" denotes a point where the user can no longer stop the finger from entering the input.

A system trigger has occurred at a point "X'" after the point "X", thus the user cannot stop the finger from entering the input. However, even though the system trigger occurs at the point "X'" as shown in FIG. 9E, since the user's finger has reached within the threshold distance (TD), the HMI activity is suspended by the operation of the present invention. Namely, the CPU 39 delays the system state change of the screen until the point "D", which is set based on the calculated interval or velocity of the user's finger input operation. Thus, the system state has not been changed from the point A to the point D, just before the POP-UP screen has appeared on the screen. Accordingly, the user can input one or more characters that the user has intended without being interrupted by the change of the system state.

FIG. 10 shows an example of structure of a vehicle navigation system for implementing the present invention. While the vehicle navigation system is explained for an illustration purpose, the present invention can also be applied to other types of electronics device either having a navigation function or not, such as a portable device implemented by a PDA (personal digital assistant) device, other hand-held devices such as a wireless telephone, or a laptop or notebook computer.

In the block diagram, the navigation system includes a data storage medium 31 such as a hard disc, CD-ROM, DVD or other storage means (hereafter "data disc") for storing the map data. The navigation system includes a control unit 32 for controlling an operation for reading the information from the data storage medium 31, and a position measuring device 33 for measuring the present position or user position. For example, the position measuring device 33 has a speed sensor for detecting a moving distance, a gyroscope for detecting a moving direction, a microprocessor for calculating a position, a GPS (global positioning system) receiver for receiving GPS signals for positioning, and etc.

The block diagram of FIG. 10 further includes a map information memory 34 for storing the map information which is read from the data storage medium 31, a database memory 35 for storing database information such as point of interest (POI) information which is read out from the data storage medium 31, a remote controller 37B for executing a menu selection operation, an enlarge/reduce operation, a destination input operation, etc. and an input device controller 38. Although a remote controller 37B is a typical example for selecting menus, executing selected functions and etc., the navigation system includes various other input methods to achieve the same and similar operations done through the remote controller, such as a touch panel 37A provided on the display screen 50.

In FIG. 10, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as the current interval (CI) and the average interval (AI) noted above, a display controller 43 for generating map image (a map guide image or an arrow guide image) on the basis of the map information, a VRAM 44 for storing images generated by the display controller 43, a menu/list generating unit 45 for generating menu image/various list images, a synthesizing unit 46, a wireless transceiver 49 for wireless communication to retrieve data from a remote server, etc., a buffer memory 48 for temporally storing data for ease of data processing, and a monitor (display) 50.

The present invention is to detect the input operation velocity or interval of the input operation associated with the user's finger action, and the location of the user's finger as to whether it is in the threshold distance (TD), and to determine whether the user has an intention for continuing the input operation when the finger is expected to make contact with the input device. Based on this information, any system changes by the HMI that the user does not expect can be adjusted (delayed, displayed differently, etc) to prevent confusion and unintended input.

The embodiment described above could also be applied to other hardware configuration (hard keys next to the monitor, or on a remote, mouse, or keyboard) and other HMI behaviors in the system. Examples include a hardware where message pop-ups appearing just as the user touches the screen, and the user never has a chance to read the message. Using the motion/distance information, the system could properly handle the situation so that message is not unexpectedly dismissed before the user can read it.

As has been described above, according to the present invention, the method and apparatus measures the distance, velocity or interval of the user's input operation during consecutive touch screen input. When the user firstly presses the touch screen to provide input, the system will calculate the user's finger distance and movement from the touch panel. The system measures the current interval (CI) of input operations conducted by the user through the input device, calculates an average interval (AI) of the series of input operation conducted so far, sets a reference interval (RI) based on the average interval (AI) and compares the current interval (CI) with the reference interval (RI) to estimate the user's finger movement.

Further, by checking whether the user's finger is within a predetermined threshold distance (TD) from the touch panel, and in case when the user's finger remains within the threshold distance (TD), all HMI (Human Machine Interface) actions of the touch panel are suspended to anticipate consecutive letter input. When the user's finger is removed from the threshold distance (TD) and is not reentered the threshold distance, the HMI actions will be resumed. The system's anticipation of the user's input allows the HMI flexibility to accommodate different type of user behavior.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for adjusting a second system state change displayed on a screen of a navigation system including an input device for responding to information displayed on the screen, the method comprising the steps of:
    determining whether a user's finger is inside a threshold distance (TD) from the screen;
    measuring a current time interval (CI) between recent two input operations in a series of input operations conducted through the input device;
    calculating an average time interval (AI) of the series of input operations;
    calculating a reference time interval (RI) determined from an equation: RI=K×(AI), where K denotes a proportional coefficient;
    determining whether the current time interval (CI) is equal to or less than the reference time interval;
    suspending an occurrence of the second system state change to be displayed on the screen when the recent two input operations of the user are related to a first system state displayed on the screen and the current time interval (CI) is equal to or less than the reference time interval (RI), where the second system state change is a new activity on the screen including a screen showing a list and a pop-up screen showing a warning;
    suspending an occurrence of the second system state change to be displayed on the screen when the recent two input operations of the user are related to the first system state displayed on the screen and the current time interval (CI) is larger than the reference time interval (RI) and the user's finger remains inside the threshold distance (TD); and
    resuming the occurrence of the second system state to be displayed on the screen when the user's finger is removed from the threshold distance (TD).

2. A method for adjusting a second system state change of claim 1, further comprising a step of:
    repeating the above step of determining whether the user's finger is inside the threshold distance (TD).

3. A method for adjusting a second system state change of claim 1, further comprising a step of:
    resuming the step of suspending an occurrence of the second system state change until the first system state has been responded in case when the current time interval (CI) is equal to or less than the reference time interval (RI) when the user's finger remains inside the threshold distance (TD).

4. A method for adjusting a second system state change of claim 3, further comprising steps of:
    determining whether a most recent input operation is a first input operation in the series input operations; and
    skipping the step of determining whether the current time interval (CI) is equal to or less than the reference time interval when the most recent input operation is the first input operation.

5. A method for adjusting a second system state change of claim 1, wherein the step of measuring a current time interval (CI) between the recent two input operations in a series of input operations conducted through the input device includes a step of starting a timer for measuring the current time interval and wherein the first system state is related to receiving character input/selection and the second system state is related to an auto-complete function for inputting characters.

6. A method for adjusting a second system state change of claim 5, wherein the step of measuring the current time interval (CI) between the recent two input operations in a series of input operations conducted through the input device further includes a step of stopping the timer for measuring the current time interval when a consecutive input operation starts.

7. A method for adjusting a second system state change of claim 6, further comprising a step of:
    resuming the second system state in case when the user's finger is removed from the threshold distance (TD) or the series of input operations has completed.

8. A method for adjusting a second system state change of claim 1, wherein the step of determining whether the user's finger is within the threshold distance (TD) includes a step of resetting a timer for measuring the current time interval (CI) in case when the user's finger is removed from the threshold distance (TD) of a motion sensor.

9. A method for adjusting a second system state change of claim 1, wherein, the step of determining whether the user's finger is inside the threshold distance (TD) is executed prior to the step of measuring the current time interval (CI) between the recent two input operations in a series of input operations conducted through the input device.

10. An apparatus for adjusting a second system state change displayed on a screen of a navigation system including an input device for responding to information displayed on the screen, the apparatus comprising:
    means for determining whether a user's finger is inside a threshold distance (TD) from the screen;
    means for measuring a current time interval (CI) between recent two input operations of a user in a series of input operations conducted through the input device;
    means for calculating an average time interval (AI) of the series of input operations;
    means for calculating a reference time interval (RI) determined from an equation: RI=K×(AI), where K denotes a proportional coefficient;
    means for determining whether the current time interval (CI) is equal to or less than the reference time interval;
    means for suspending an occurrence of the second system state change displayed on the screen when the recent two input operations of the user are related to a first system state displayed on the screen and the current time interval (CI) is equal to or less than the reference time interval (RI), where the second system state change is a new activity on the screen including a screen showing a list and a pop-up screen showing a warning;
    means for suspending an occurrence of the second system state change displayed on the screen when the recent two input operations of the user are related to the first system state displayed on the screen and the current time interval (CI) is larger than the reference time interval (RI) and the user's finger remains inside the threshold distance (TD); and means for resuming the occurrence of the second system state to be displayed on the screen when the user's finger is removed from the threshold distance (TD).

11. An apparatus for adjusting a second system state change of claim 10, further comprising:
   means for repeating the above operation of determining whether the user's finger is inside the threshold distance (TD).

12. An apparatus for adjusting a second system state change of claim 10, further comprising:
   means for resuming the step of suspending an occurrence of the second system state change until the first system state has been responded in case when the current time interval (CI) is equal to or less than the reference time interval (RI) when the user's finger remains inside the threshold distance (TD).

13. An apparatus for adjusting a second system state change of claim 12, further comprising:
   means for determining whether a most recent input operation is a first input operation in the series input operations; and
   means for skipping the step of determining whether the current time interval (CI) is equal to or less than the reference time interval when the most recent input operation is the first input operation.

14. An apparatus for adjusting a second system state change of claim 10, wherein the means for measuring a current time interval (CI) between the recent two input operations in a series of input operations conducted through the input device includes means for starting a timer for measuring the current time interval and wherein the first system state is related to receiving character input/selection and the second system state is related to an auto-complete function for inputting characters.

15. An apparatus for adjusting a second system state change of claim 14, wherein the means for measuring the current time interval (CI) between the recent two input operations in a series of input operations conducted through the input device further includes means for stopping the timer for measuring the current time interval when a consecutive input operation starts.

16. An apparatus for adjusting a second system state change of claim 15, further comprising:
   means for resuming the second system state in case when the user's finger is removed from the threshold distance (TD) or the series of input operations has completed.

17. An apparatus for adjusting a second system state change of claim 10, wherein the means for determining whether the user's finger is within the threshold distance (TD) includes means for setting a distance flag to reset a timer for measuring the current time interval (CI) in case when the user's finger is removed from the threshold distance (TD) of a motion sensor.

18. An apparatus for adjusting a second system state change of claim 10, wherein, the means for determining whether the user's finger is inside the threshold distance (TD) is executed prior to measuring the current time interval (CI) between the recent two input operations in a series of input operations conducted through the input device.

\* \* \* \* \*